United States Patent [19]

Olson

[11] Patent Number: 4,843,983

[45] Date of Patent: Jul. 4, 1989

[54] PNEUMATIC MANIFOLD QUICK COUPLING

[75] Inventor: Jay H. Olson, Moline, Ill.

[73] Assignee: Deere & Company, Moline, Ill.

[21] Appl. No.: 151,357

[22] Filed: Feb. 2, 1988

[51] Int. Cl.$^4$ .................... A01C 7/18; B65G 53/52
[52] U.S. Cl. ............................. 111/174; 406/191;
   406/196; 406/41; 111/118
[58] Field of Search .................. 111/34, 77, 52;
   406/191, 196, 38–41, 184, 185; 285/240, 95, 110

[56] References Cited

U.S. PATENT DOCUMENTS

| | | | |
|---|---|---|---|
| 1,336,323 | 4/1920 | Stout | 285/95 |
| 1,597,635 | 8/1926 | Stickdorn | 285/110 |
| 3,631,825 | 1/1972 | Weiste | 111/73 |
| 3,955,834 | 5/1976 | Ahlrot | 285/110 |
| 4,025,092 | 5/1977 | Wakefield | 285/110 |
| 4,296,695 | 10/1981 | Quanbeck | 111/34 |

FOREIGN PATENT DOCUMENTS 748  3/1981  World Int. Prop. O. .......... 285/110

Primary Examiner—Danton D. DeMille

[57] ABSTRACT

A quick pneumatic coupling particularly well adapted for use in a folding agricultural planter comprises a rigid plastic funnel mounted to the end of a first conduit and a flexible and resilient rubber flange member mounted to a second conduit. The inner surface of the funnel forms a sealing surface which is contacted by the flange when it is inserted into the funnel. The coupling can be automatically coupled and decoupled by pivotally inserting and withdrawing the flanged member into and out of the receiving funnel.

4 Claims, 2 Drawing Sheets

PNEUMATIC MANIFOLD QUICK COUPLING

BACKGROUND OF THE INVENTION

1. Field of the Invention

The invention is directed to a quick coupling for a pneumatic manifold on a foldable agricultural planter.

2. Description of the Prior Art

Farm implement manufacturers have been making larger and wider implements to reduce the number of passes a farmer must make across a field. In this way, the farmer can maximize his return by increasing his work output for unit time spent in various operations. However, as implements have increased in size, the transport of an implement from one field to another has become more difficult.

To overcome this transport problem, agricultural implement manufacturers have come up with a number of different approaches. With rigid toolbar planters, the implement may be loaded lengthwise on a trailer for towing behind a tractor. Other solutions involve folding the toolbar either forwardly or vertically. One example of a forwardly folded toolbar is the 7200 Flex-Fold MaxMerge 2 planter manufactured by the assignee of the present application. An example of a vertical fold planter is 7300 Vertical Fold Max Merge Planter also manufactured by the assignee of the present invention.

The planter implement is provided with a number of planter units. Each planter unit is provided with a seed meter for selecting a seed and directing it into the planting trench. One type of seed meter is a vacuum seed meter wherein a vacuum is applied behind a rotating disc having a series of apertures for selecting individual seeds and releasing them into a seed trench.

Such a vacuum seed meter is manufactured by the assignee of the present invention as an option on MaxMerge 2 planter. With this seed meter, a single vacuum source, such as a blower, is pneumatically coupled to each of the planter units by a manifold which comprises a rigid plastic pipe. Although this system works well with rigid toolbar planters, flexible tubing must be used to couple the rigid sections for folding toolbars. Flexible tubing, however, increases the pressure drops in the pneumatic system and is costly to manufacture. In addition, the flexible tubing may become kinked during the folding and unfolding operation.

SUMMARY OF THE INVENTION

The present invention overcomes the limitations of the prior art by providing a pneumatic system having a quick coupling between adjacent rigid conduits thereby reducing the need for the flexible tubing.

It is one of the objects of the present invention to provide a simplified pneumatic coupling between adjacent pneumatic conduits that is self centering so that it can be quickly coupled and decoupled in an automatic manner.

It is another object of the present invention to provide a pneumatic coupling for a vacuum manifold, wherein the vacuum assists in pneumatically sealing the coupling.

These and other objects of the present invention are achieved by a pneumatic coupling having a rigid receiving portion and a flexible and resilient insertion member. The rigid receiving member comprises a funnel that is mounted on a first rigid conduit and which is provided with an inner sealing surface. The insertion member comprises a sleeve having a flexible and resilient flange which is inserted into the funnel and sealingly contacts the sealing surface of the funnel. The receiving portion and the insertion member are self seating and, therefore, can be automatically coupled when a planter is being unfolded into its planting position.

DETAILED DESCRIPTION

Figure 1:
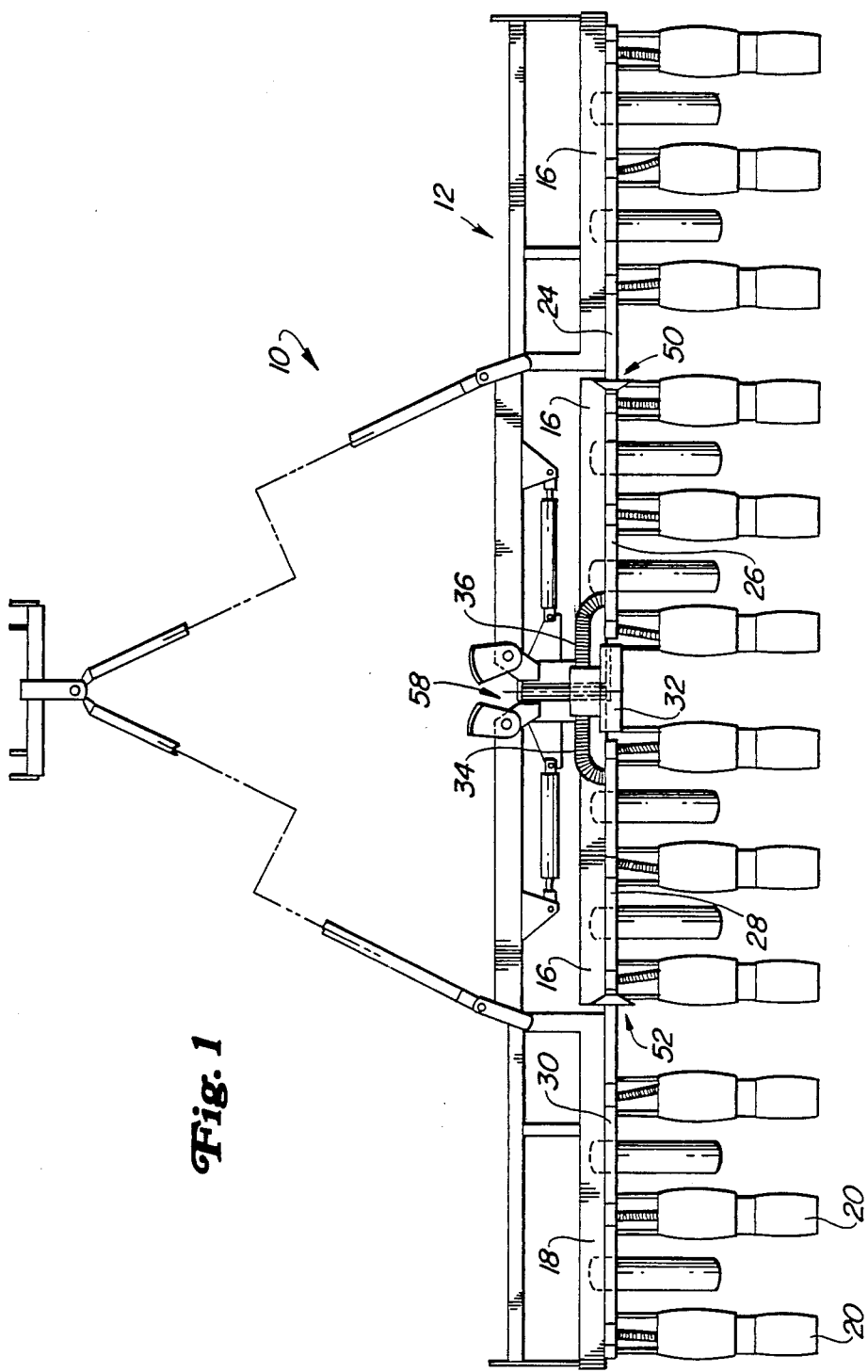
FIG. 1 is a top view of a folding planter having the quick couplings of the present invention.
Figure 2:
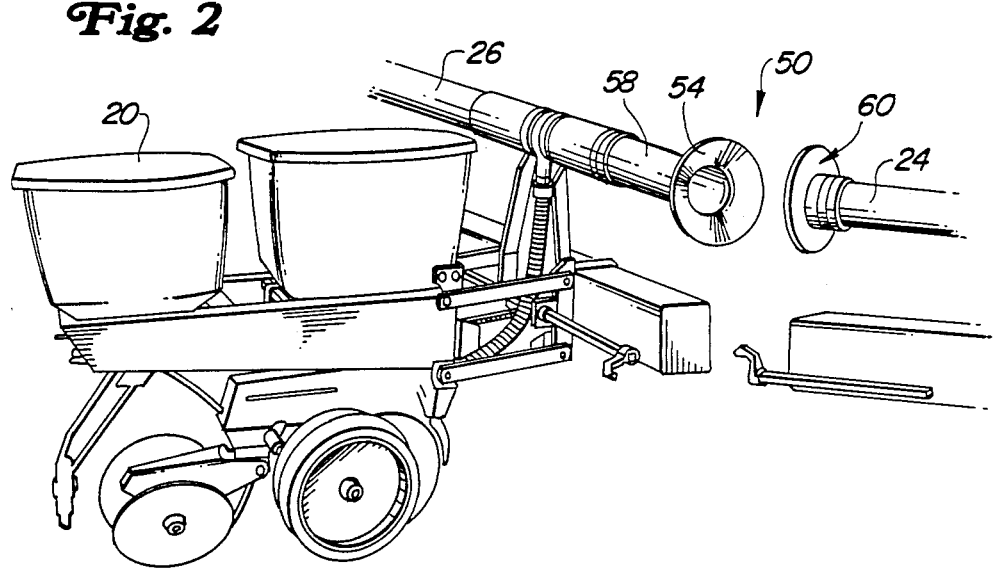
FIG. 2 is a perspective view of the quick coupling mounted to a planter.

Planter 10 illustrated in FIG. 1 comprises an elongated frame 12 having three foldable frame sections 14, 16 and 18. The planter is arranged in its planting configuration. The three frame sections are pivotally coupled to one another so that the frame may be folded into a transport configuration. A plurality of planter units 20 are arranged along each frame section and are used for inserting seeds into the ground. The planter is towed through a field by a tractor which is coupled to hitch 22.

Each of the planter units is provided with a vacuum seed meter which is used for selecting a seed and directing the selected seed into the seed trench. Each of the vacuum seed meters is supplied vacuum by rigid pneumatic conduits 24, 26, 28 and 30. Each of the conduits is pneumatically coupled to the adjacent planter units. The vacuum is generated by blower 32 which is pneumatically coupled to conduits 26 and 28 by flexible tubing 34 and 36.

Figure 3:
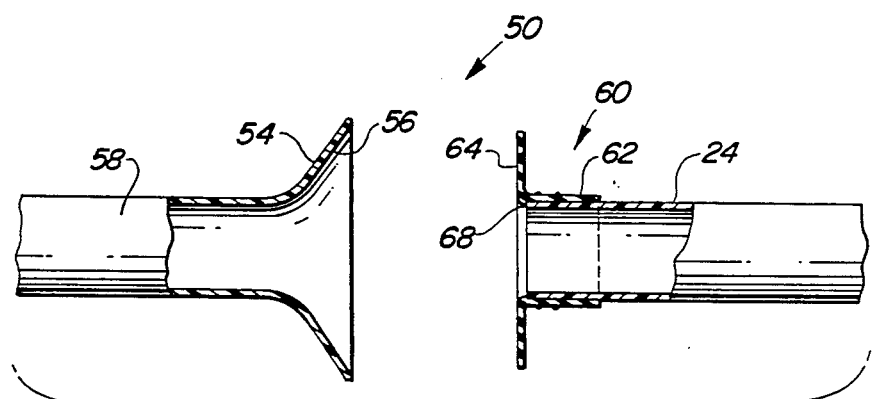
FIG. 3 is a detail cross sectional view of the pneumatic quick coupling of the present invention uncoupled.
Figure 4:
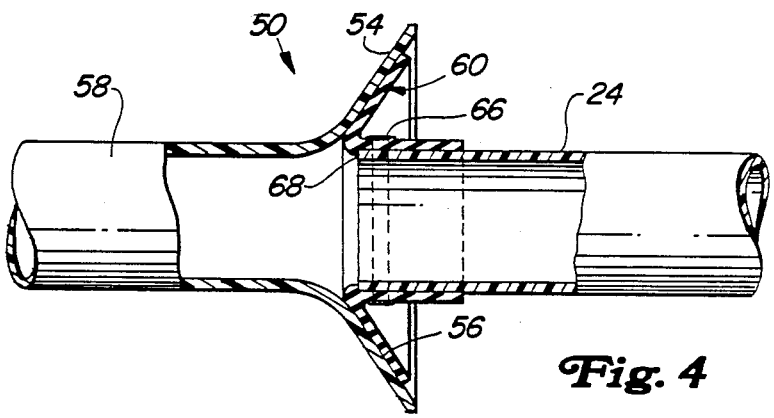
FIG. 4 is a detail cross sectional view of the pneumatic quick coupling of the present invention coupled.

In the present invention first rigid conduit 24 is pneumatically coupled to second rigid conduit 26 by pneumatic quick coupling 50, and third rigid conduit 28 is pneumatically coupled to fourth rigid conduit 30 by pneumatic quick coupling 52. Pneumatic quick coupling 50 best illustrated in FIGS. 3 and 4, is identical to coupling 52 and as such, only coupling 50 will be discussed.

It should be noted that even in its planting configuration, toolbar 12 is free to vertically pivot about point 53 so as to accommodate planting on rolling terrain. Therefore, flexible tubing 34 and 36 are maintained to allow for flexing of the toolbar.

Coupling 50 comprises a rigid receiving portion comprising funnel 54 having inner sealing surface 56. Sleeve portion 58 of the funnel is telescopingly mounted to first rigid conduit 26. The funnel is made of a rigid high density polyethylene plastic and will not deform when insertion member 60 is inserted into the funnel. The conical shape of sealing surface 56 acts to center the insertion member in the receiving portion.

Insertion member 60 comprises an integral member having sleeve 62 and flange 64. The sleeve of member 60 is telescopingly mounted to second rigid conduit 24 by hose clamp 66. Member 60 is flexible and resilient and may be made from an elastomeric material such as rubber, so that it will deform as it enters funnel 54 and contacts sealing surface 56. In addition, member 60 is provided with an internal lip 68 which engages the outer edge of conduit 24.

When a vacuum is applied to rigid conduit 26 by a blower 32 a vacuum is formed in the conduits that tends to draw flange 64 into further sealing contact with sealing surface 56. Insertion member 60 only needs to be inserted into funnel 54, so that flange 64 barely touches sealing surface 56. The vacuum pulls flange 64 into sealing engagement with funnel 54.

Couplings 50 and 52 can be automatically coupled and decoupled by manipulating the folding planter. More specifically, when frame members 14 and 16 are pivoted into their transport positions, the insertion member is withdrawn from the receiving portion decoupling the conduits. Conversely, as the sections are pivoted from their transport positions to their planting position, the insertion members are inserted into the receiving portions coupling the conduits.

The present invention provides a simplified pneumatic quick coupling that can be coupled in an automatic manner, as such, it should not be limited by the above described embodiment, but should be limited solely by the claims that follow.

I claim:

1. A planting implement comprising:
   an elongated frame having first and second adjacent frame sections including means pivotally coupling the first and second adjacent frame sections to one another, said first and second frame sections are aligned when the planting implement is in its planting configuration, said first and second frame sections are folded away from one another when the planting implement is in its transport configuration;
   a plurality of planting units are mounted to the elongated frame with at least one planting unit being mounted to each frame section, each of the planting units is provided with a vacuum seed meter;
   a first conduit is mounted on the first frame section and a second conduit is mounted on the second frame section, means pneumatically coupling the first conduit to each of the seed meters for the planting units mounted on the first frame section, and means pneumatically coupling and the second conduit to each of the seed meters for the planting units mounted on the second frame section;
   a source of pressurized air, and means pneumatically connecting said source of pressurized air to one of the conduits for applying a vacuum to the vacuum seed meters;
   a pneumatic quick coupling is connected between the first and second frame sections for pneumatically coupling the frame sections to one another, the coupling is provided with a receiving portion is connected to the first conduit having, said receiving portion having a funnel with an inner surface forming a sealing surface, and the coupling also including an insertion member is connected to the second conduit and having a flexible and resilient flange extending outwardly from a sleeve, whereby a pneumatic seal is automatically formed between the flange and the sealing surface when the planting implement is in its planting configuration and a vacuum is applied to the vacuum seed meter, the quick coupling is decoupled when the planting implement is in its transport configuration.

2. A planting implement as defined by claim 1 wherein the funnel of the receiving portion is mounted to the first conduit, and the sleeve of the insertion member is mounted to the second conduit.

3. A planting implement as defined by claims 2 wherein the flange is made of an elastomeric material and the funnel is made of a rigid plastic.

4. A planting implement as defined by claim 3 wherein the flange is circular.

* * * * *